(12) United States Patent
Döppling et al.

(10) Patent No.: US 6,370,976 B1
(45) Date of Patent: Apr. 16, 2002

(54) GEAR SHIFTING DRUM FOR A VARIABLE-SPEED GEARBOX

(75) Inventors: Horst Döppling; Wolgang Steinberger, both of Herzogenaurach; Manfred Winkler, Aurachtal, all of (DE)

(73) Assignee: Ina Wälzlager Schaeffler OHG, Herzogenaurach (DE)

( * ) Notice: Subject to any disclaimer, the term of this patent is extended or adjusted under 35 U.S.C. 154(b) by 0 days.

(21) Appl. No.: 09/446,430

(22) PCT Filed: Jun. 15, 1998

(86) PCT No.: PCT/EP98/03597

§ 371 Date: Dec. 17, 1999

§ 102(e) Date: Dec. 17, 1999

(87) PCT Pub. No.: WO99/00614

PCT Pub. Date: Jan. 7, 1999

(30) Foreign Application Priority Data

Jun. 28, 1997 (DE) .......................................... 197 27 569

(51) Int. Cl.[7] .............................................. F16H 63/18
(52) U.S. Cl. ...................................................... 74/337.5
(58) Field of Search ............................ 74/337.5, 473.36

(56) References Cited

U.S. PATENT DOCUMENTS 4,655,309 A * 4/1987 Imaizumi et al. ............ 180/215
4,658,661 A * 4/1987 Terashita ................. 74/337.5 X
5,542,309 A    8/1996 Wenger et al. .............. 74/337.5
5,868,641 A * 2/1999 Bender et al. ............... 475/203
5,988,009 A * 11/1999 Tornatore et al. ........ 74/337.5 X

FOREIGN PATENT DOCUMENTS

| DE | 806095 | * | 7/1949 |
| DE | AS 12 02 665 | | 10/1965 |
| DE | 195 09 477 A1 | | 9/1996 |
| DE | 197 13 423 A1 | | 11/1997 |
| JP | 60-26857 A | | 2/1985 |
| JP | 62-220762 A | | 9/1987 |
| WO | WO 96/30675 A1 | | 10/1996 |

OTHER PUBLICATIONS

JP 60–26858 A., In: Patents Abstracts of Japan, M–390, Jun. 25, 1985, vol. 9, No. 149; Kouyou Seiki K.K. Hideo Takimoto, "Manufacture of change drum".

* cited by examiner

Primary Examiner—Charles A Marmor
Assistant Examiner—Ankur Parekh
(74) Attorney, Agent, or Firm—Henry M. Feiereisen

(57) ABSTRACT

A gear shifting drum (2) for a gear shifting device of variable-speed gearboxes for motor vehicles has a curved path (11a to 11c) for guiding an engagement member (13) of the gearshift fork (12a to 12c), wherein the gearshift fork (12a to 12c) is directly connected to a synchronization device. According to the invention, at least one radially outwardly directed wall (9, 10) is arranged on the outer surface area (8) of the gear shifting drum (2) for formation of the curved path (11a to 11c).

14 Claims, 4 Drawing Sheets

GEAR SHIFTING DRUM FOR A VARIABLE-SPEED GEARBOX

FIELD OF THE INVENTION

The invention relates to a gear shifting drum for a gear shifting device of variable-speed gearboxes for motor vehicles, with an outer surface area of the cylindrical gear shifting drum having at least one curved path for form-fitting guidance of an engagement member of a gearshift fork, wherein the gearshift fork is connected to a gearshift sleeve of a synchronization device which is arranged for axial displacement between two gears on a gearbox shaft disposed in parallel relation to the gear shifting drum.

A gear shifting device including a gear shifting drum of the above-stated type is described in the magazine "auto motor sport", edition 7/1995, pages 98 to 100. The gear shifting drum replaces a commonly used H gearshift, whereby unlike the conventional gearshift, the single shift stages, i.e. the gears, are shifted sequentially in a row or plane. The gear control lever returns to its initial position after engaging a gear so as to be available for shift to a next gear. In this manner, it is possible to use a reverse motion of the gear control lever for a upshift and a forward movement from the initial position for a downshift. The gear shift mechanism provided with a gear shifting drum prevents a bypassing of gears because a shift from an engaged gear can only be carried out to the neighboring gear, i.e. the next higher or next lower gear. Translation of the motion as triggered by the gear control lever to a rotary motion of the gear shifting drum for realizing a gear change is effected by an electric control motor by which the shift impulses, triggered by the gear control lever, are translated in a defined rotary motion of the gear shifting drum. As a consequence of the positive fit of the gearshift fork in the curved path of the gear shifting drum, a turn of the gear shifting drum results in an axial displacement of the gearshift fork which is connected with a gearshift sleeve of the synchronization device. The conventional gear shifting drum includes a cylindrical base body having an outer surface area formed with a curved path. The gear shifting drum known from the prior art is made from solid material through a material-removing process, in particular through a profile milling machine. Such a gear shifting drum is complicated to manufacture, incurs high manufacturing costs and has a relatively high weight which runs counter to the demand for lightweight construction.

OBJECT OF THE INVENTION

It is an object of the invention to provide a gear shifting drum which, compared to the state of art, has a curved path made in a cost-efficient manner and is advantageous with respect to weight concerns.

SUMMARY OF THE INVENTION

This object is attained in accordance with the invention by the subject matter of claims 1 and 2.

The invention according to claim 1 provides for a gear shifting drum which has at least one wall on its outer surface area for formation of a curved path, with the wall extending radially outwards from the outer surface area. Such a gear shifting drum may be formed, for example, by a hollow cylindrical sheet metal body whereby a sheet metal strip circumscribes the cylindrical body and is permanently attached to the outer surface area, for example by welding or soldering, for formation of the wall. The wall has a circumferential area which is profiled in accordance with the configuration of the curved path.

According to the invention set forth in claim 2, the gear shifting drum includes a hollow cylindrical base body which is surrounded in concentric relation by a cylindrical sleeve formed with the curved paths. This measure permits the continuous use of same base bodies which can be combined with sleeves having differently configured curved paths. Thus, this invention offers, for example, to the gearbox manufacturer, for purposes of cost reduction, the option to increase the stock of same components. A positionally fixed arrangement on the base body can be realized when securing the sleeve, for example by welding, soldering or gluing.

Common to both inventions is a concept of the gear shifting drum to significantly reduce the complexity of manufacture. The invention set forth in claim 1 eliminates any material-removing process for providing the curved paths. The further invention set forth in claim 2 relates to a gear shifting drum which is so designed that the required material-removing process to form the curved path can be significantly reduced compared to the known prior art.

Further features of the invention are subject matter of the dependent claims 3 to 14.

According to an aspect of the invention set forth in claim 1, the gear shifting drum includes for formation of a curved path two walls in spaced-apart relation for guiding the engagement member of the gearshift fork. As an alternative, which optimizes the structural design, the invention includes also a curved path which is made from one wall on which the engagement member of the gearshift fork is guided by means of a forked projection.

In accordance with the invention, a cylindrical base body is provided as gear shifting drum and has an outer surface area for permanent attachment of pairs of perforated spaced-apart disks of undulating profile, whereby these disks, which form a curved path, are permanently secured to the circumference of the base body. As an alternative to the perforated disks, the curved paths of a gear shifting drum can be provided by means of a square or rectangular profiled strand or round profile, whereby respectively two paired profiles are arranged on the circumference of the outer surface area of the base body.

Preferably, the curved path of the gear shifting drum can be further constituted by a single-piece U-shaped profile which corresponds to the configuration of the curved path and is secured to the circumference of the base body. The spacing between both legs of the U rail is thereby suited to the required width dimension of the engagement member of the gearshift fork. This U rail reduces the required manufacturing costs and, moreover, contributes to a reinforcement of the gear shifting drum which thus can be optimized with respect to weight by reducing the wall strength.

A defined length of the curved path can be realized by so designing the walls of the gear shifting drum that their end zones are closed, i.e. turned inwardly with respect to one another to thereby form a stop for the engagement member of the gearshift fork.

Suitable for the manufacture of the base body for the gear shifting drum is, preferably, a tubular body of sheet steel having end faces closed by lids of sheet steel. The inherent stiffness of the gear shifting drum, of the positional securement, as well as the attachment to the base body can be enhanced by designing the lids of preferable pot-shaped configuration.

According to a further feature of the invention, the lids are each provided with an axially projecting central pin to permit a rotating arrangement of the gear shifting drum in the gearbox housing. The pin may be formed in one piece with the lid or may constitute a separate component which is permanently secured to the lid.

Rotation of the gear shifting drum in dependence on the movement of the gear control lever is realized, preferably, by a control motor which executes a defined and precise turning of the gear shifting drum by means of a geared connection. The gear shifting drum includes thereby outer teeth for direct engagement of a gear of the control motor. As an alternative, the translation of a rotary motion between the control motor and the gear shifting drum can also be realized by a gear rack. The outer teeth of the gear shifting drum may be implemented by, for example, correspondingly designing one of the end lids at the end face. Also suitable is a separate ring provided with outer teeth and circumscribing the gear shifting drum.

An improved shifting accuracy of the gear shifting drum can be accomplished by connecting the gear shifting drum with a locking device which ensures an exact rotational locking of the gear shifting drum in dependence to the gear being engaged. The locking device may be formed, for example, by providing a lid with dome-shaped recesses or impressions for interaction with a spring-loaded spherical locking member which is positioned in the gearbox housing. The locking device may further be provided with a switch for optical display of the actually engaged whereby an interaction is provided between a particularly designed, especially recessed impression which is assigned to the reverse gear position and a spherical locking member of the locking device with the spherical locking member applying of an increased stroke. This particular locked position, which is assigned to the reverse gear, can be used in conjunction with a switch for actuation of a motor vehicle switch for a tail light.

A weight reduction can be realized in accordance with the invention by making the base body of the gear shifting drum from plastic material or light metal, and by securing the walls through gluing or another permanent attachment procedure, to the base body for making the curved paths.

According to an aspect of the invention, set forth in claim 2, the base body and the coaxial sleeve of the gear shifting drum are made from different materials. Optimization of weight can be realized by making the base body from plastic material and the complementary sleeve from steel for strength reasons and for improving the wear resistance.

BRIEF DESCRIPTION OF THE DRAWING

Exemplified embodiments of the invention will now be described in more detail with reference to the drawing, in which.

DETAILED DESCRIPTION OF THE DRAWINGS

Figure 1:
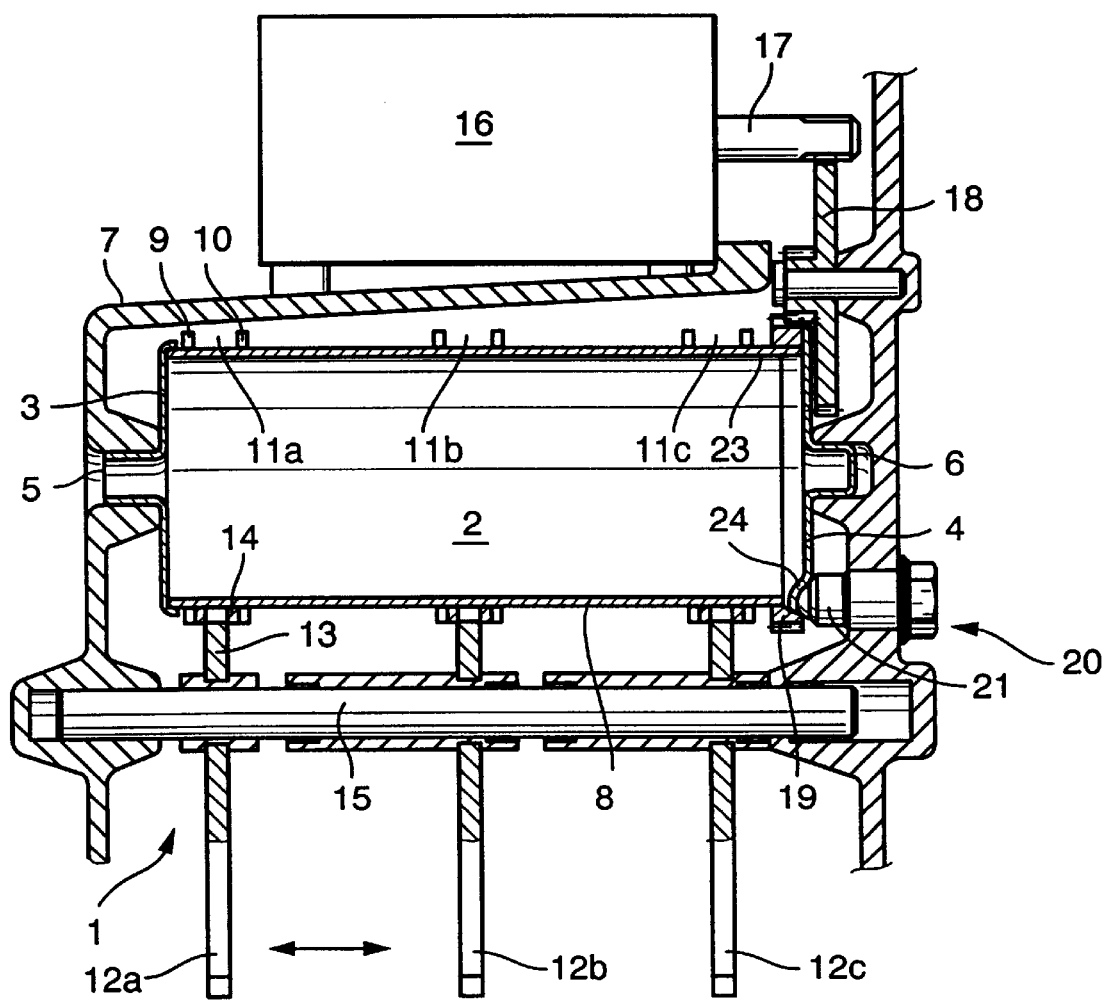
FIG. 1 is a longitudinal section of a gear shifting drum according to the present invention in assembled state.

FIG. 1 shows a longitudinal section of a detail of a gearshift of a variable-change gearbox 1. The gear shift is realized by a hollow cylindrical gear shifting drum 2 which has opposite end faces closed by lids 3, 4. Both lids 3, 4 have an axially projecting central projection 5, 6 for providing a support of the gear shifting drum 2 in a housing of the variable-change gearbox 1. Arranged on an outer surface area 8 of the gear shifting drum 2 are axially spaced-apart walls 9, 10 which substantially circumscribe the gear shifting drum 2. The walls 9, 10 have an undulated circumference and form a curved path 11a (see also FIG. 2). The gear shifting drum 2 is provided with three curved paths 11a to 11c in offset disposition, which are also designated as gearshift grooves. Each curved path 11a to 11c has assigned thereto a gearshift fork 12a to 12c which engages in form-fitting manner via an engagement member 13 in the curved path 11a to 11c. Guidance of the engagement member can be improved through provision of a guide element 14 which is guided in form-fitting manner between the walls 9, 10. All gearshift forks 12a to 12c are axially displaceable on a gearbox shaft 15 which is installed in axis-parallel relation to the gear shifting drum 2 in the gearbox housing. The gearshift forks 12a to 12c encompass with their forked ends a not shown gearshift sleeve which is displaceable in axial direction on a gearbox shaft via a toothed section. Each gearshift sleeve is thereby in connection with a synchronization device. Starting from a center position or neutral position of the gearshift sleeve, a displacement in axial direction results in a gear shift via the gearshift forks 12a to 12c.

Mode of Operation of the Gearshift Drum:

Shift into single gears requires an axial displacement of the gearshift forks 12a to 12c (see double arrow). As a consequence of the guide geometry of the curved paths 11a to 11c, the gearshift forks 12a to 12c, which are guided in form-fitting manner via the engagement members 13 in the curved paths, can be moved in both axial directions in correspondence to the curved path 11a to 11c, when the gear shifting drum rotates. The gear shifting drum 2 is operated by a rotary drive in the form of a control motor 16 which is arranged at the outside of the housing 7 of the variable-change gearbox 1. The control motor 16 has an output shaft 17 which has teeth on one end and is provided, for drive reduction, with a relatively large intermediate gear 18 that further includes an axially offset small gear for meshing with a ring gear 19 which encompasses on the outside the lid 4 of the gear shifting drum 2. The reversible, i.e. switch-over control motor 16 permits in dependence on the gear selection, which may be realized, for example by a manually operated gear control lever, a targeted rotation of the gear shifting drum 2. Furthermore, the control motor 16 ensures a defined shifting speed to prevent an overload of the synchronization device. The gear positions can be precisely engaged by providing the gear shifting drum 2 with a locking device 20 which includes a spring-loaded locking member 21 provided in the wall of the housing 7 and locking in impressions 24, i.e. recesses on the end face of the lid 4 for positioning.

Figure 2:
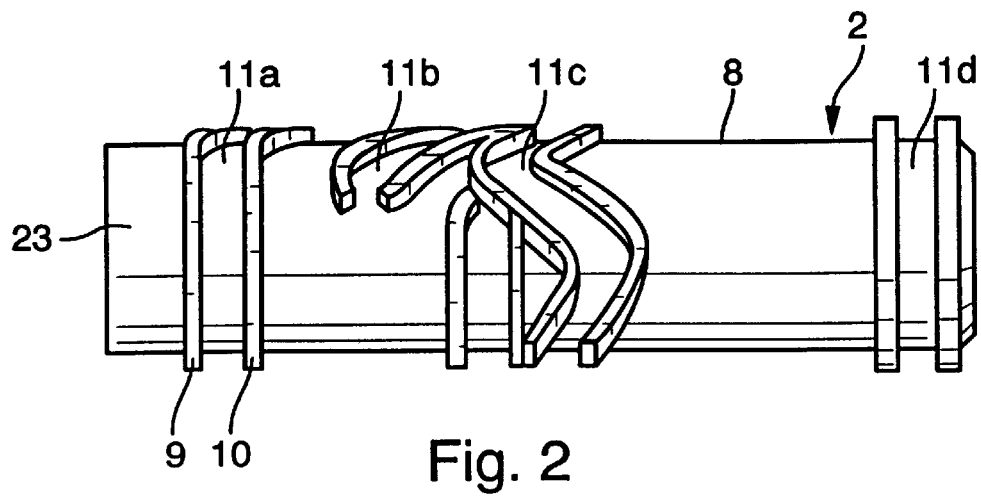
FIG. 2 is a cutaway illustration of a single component of the gear shifting drum of FIG. 1 in assembled state.

FIG. 2 shows a representation of the gear shifting drum 2. This illustration shows the undulating configuration of differently designed curved paths 11a to 11d. A cost-efficient gear shifting drum 2 can be realized when providing the gear shifting drum with a cylindrical base body 23 having a circumference for arrangement of undulating walls 9, 10 in axial spaced-apart disposition for formation of a desired curved path 11a to 11d. Examples for walls 9, 10 may include square or rectangular continuous profiles which can be cut to size and are configured with an undulating profile on the outer surface area 8.

Figure 3:
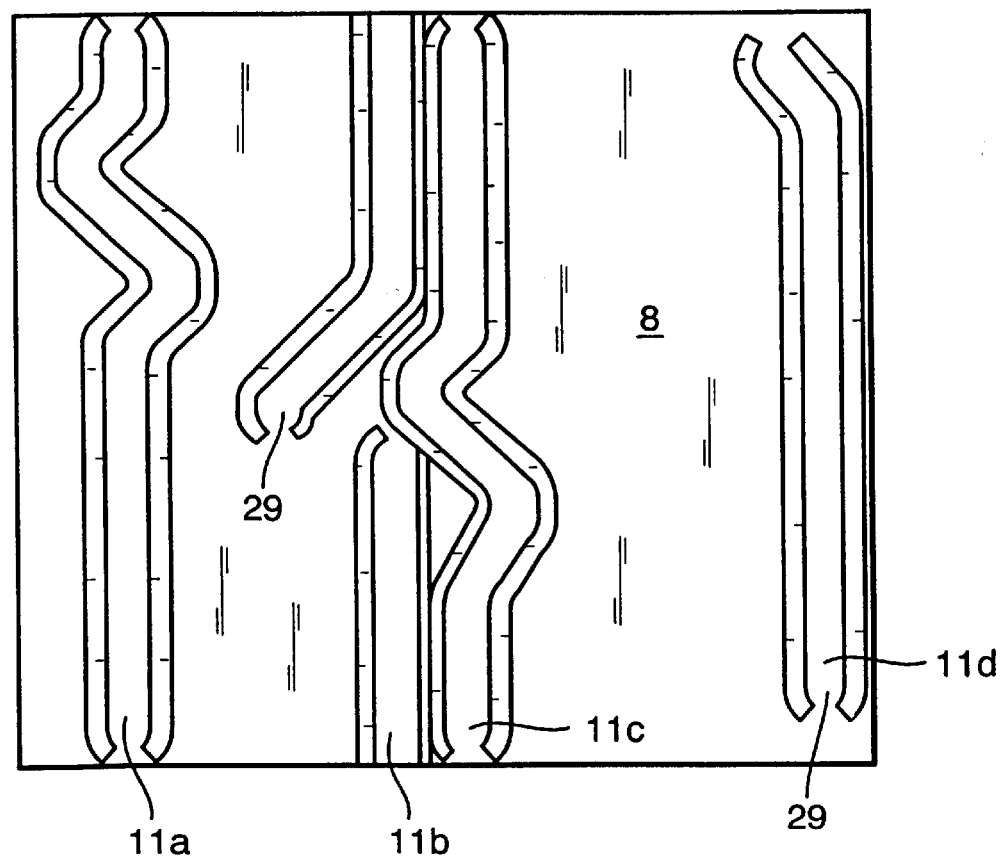
FIG. 3 is a developed view of an outer surface area of the gear shifting drum of FIG. 2.

The developed view of the outer surface area 8 of the gear shifting drum 2 according to FIG. 2 is shown in FIG. 3. The ends of the curved paths 11*a* to 11*d* are substantially closed in end zones 29 with their walls being turned inwardly. These end zones 29 from a stop for the engagement members 13 conducted in the curved paths 11*a* to 11*d*.

Figure 4:
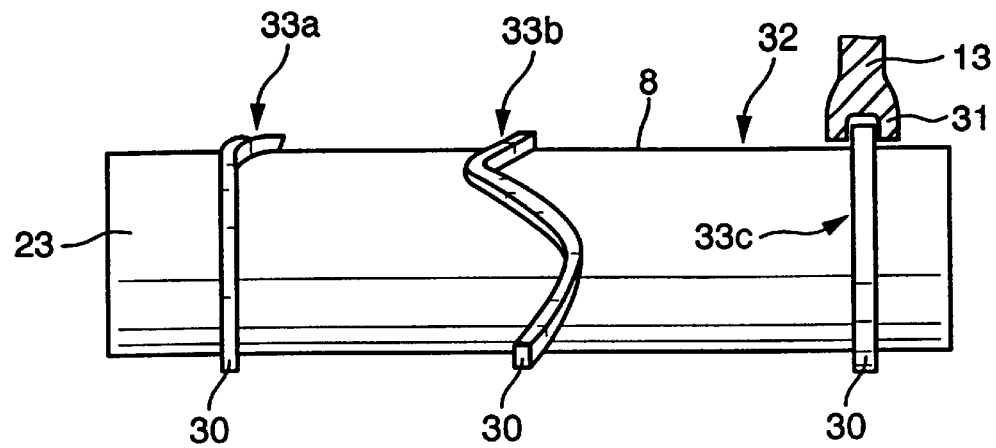
FIG. 4 is a gear shifting drum which is comparable to the gear shifting drum illustrated in FIG. 2 and has a wall forming the curved path.
Figure 5:
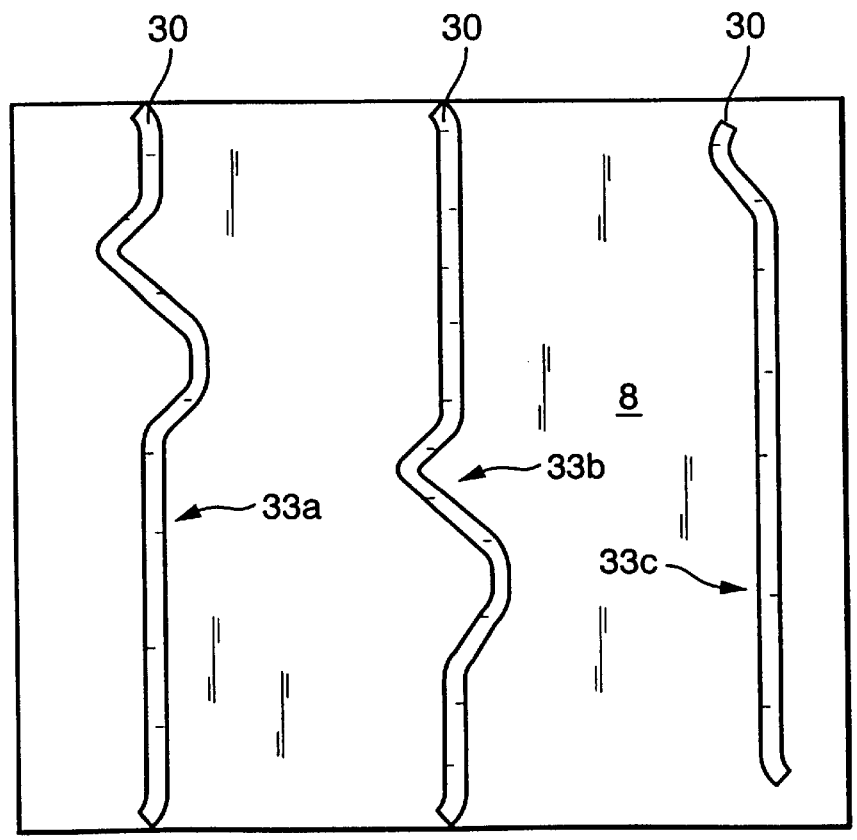
FIG. 5 is a developed view of the outer surface area of the gearshift rod illustrated in FIG. 4.

FIGS. 4 and 5 shows the gear shifting drum 32 which represents an alternative to the gear shifting drum 2 depicted in FIG. 2. The curved paths 33*a* to 33*c* are thereby each formed by a wall 30, preferably by a profiled strand of square or rectangular cross section. For guidance, the engagement members 13 have ends in the form of a forked projection 31 which surrounds the wall 30. This results in an optimum configuration and weight reduction of the guidance of the engagement members.

Figure 6:
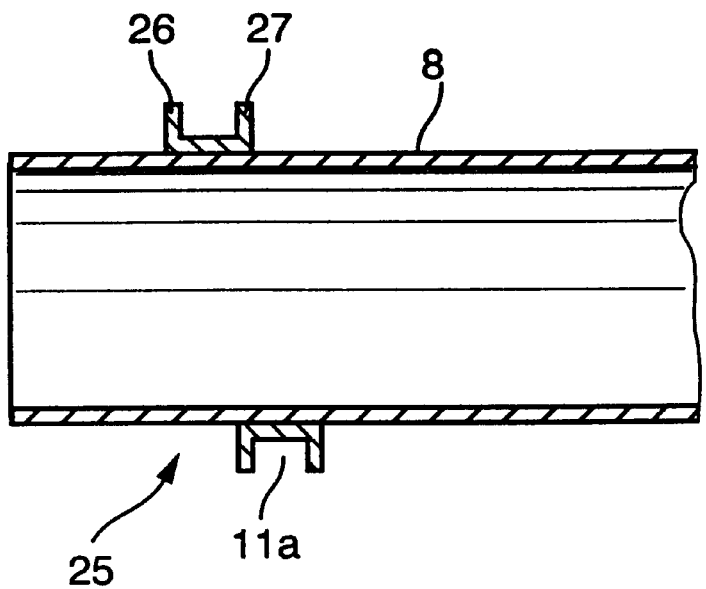
FIG. 6 is a cutaway view of a gear shifting drum with a curved path which differs from FIG. 2.

FIG. 6 shows an alternative curved path 11*a* which is formed by a U-shaped profile arranged in undulating fashion on the outer surface are 8 of the gear shifting drum 2. The engagement member 13 of the gearshift fork 12*a* to 12*c* (see FIG. 1) is thereby guided along walls 26, 27 of the profile 25, with the walls having a spacing therebetween which is suited to the diameter of the guide element 14.

Figure 7:
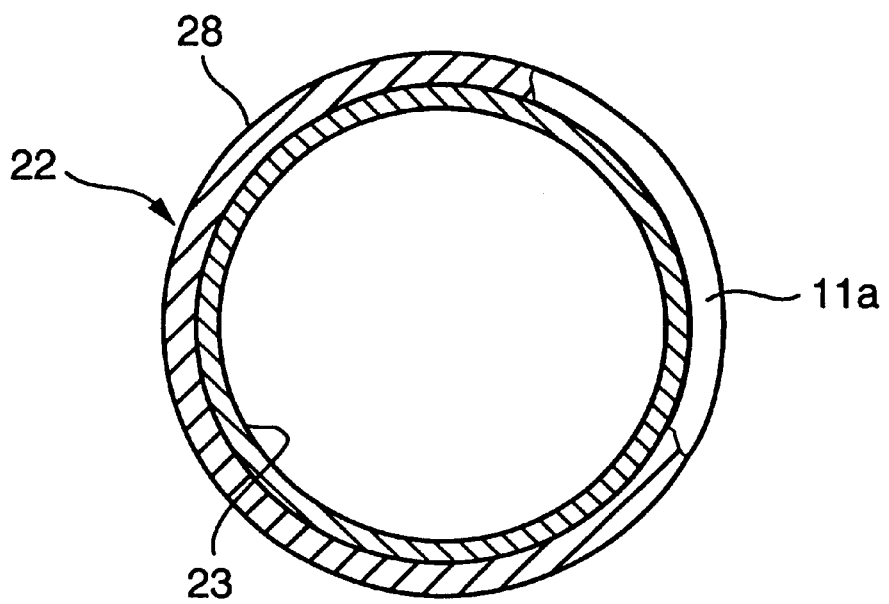
FIG. 7 is a cross sectional view of a gear shifting drum in the form of two shells.

FIG. 7 shows a two-shell configuration of the gear shifting drum 22. The base body 23 is therefore enclosed by a cylindrical sleeve 28 which is formed with the curved path 11*a*. This configuration permits a pre-manufacture of a sleeve 28 which is provided with all necessary curved paths 11*a* to 11*d*. Furthermore, this configuration offers the gearbox manufacturer, who needs different gear shifting drums, cost savings and an increase in stock of same components because base bodies 23 of same type can be used and combined with different sleeves 28. Optimization of weight and attenuation of noise can be realized through use of different materials for the sleeve 28 and the base body 23. Thus, it is possible to make the sleeve of sheet steel which is permanently arranged to a base body of plastic material. Such a material pair positively affects the noise generation of components that are connected to the gear shifting drum 22.

LIST OF REFERENCE NUMERALS 1 variable-speed gearbox
2 gear shifting drum
3 lid
4 lid
5 projection
6 projection
7 housing
8 outer surface area
10 outer surface area
11*a* curved path
11*b* curved path
11*c* curved path
12*a* gearshift fork
12*b* gearshift fork
12*b* gearshift fork
13 engagement member
14 guide element
15 gearbox shaft
16 control motor
17 output shaft
18 intermediate gear
19 ring gear
20 locking device
21 locking member
22 gear shifting drum
23 base body
24 impression
25 profile
26 wall
27 wall
28 sleeve
29 end zone
30 wall
31 projection
32 gear shifting drum
33*a* curved path
33*b* curved path
33*c* curved path

What is claimed is:

1. Gear shifting drum device of a variable-speed gearbox for motor vehicles, with an outer surface area of the cylindrical gear shifting drum having at least one curved path for form-fitting guidance of an engagement member of a gearshift fork, wherein the gearshift fork is connected to a gearshift sleeve of a synchronization device which is arranged for axial displacement between two gears on a gearbox shaft disposed in parallel relation to the gear shifting drum, characterized in that at least one radially outwardly directed wall is arranged on the outer surface area of the gear shifting drum for formation of the curved path, wherein a single-piece of U-shaped profile is provided for formation of the curved path and pre-manufactured with corresponding cylindrical configuration for securement to the outer surface area.

2. A gear shifting drum for a gear shifting device of a variable-speed gearbox for motor vehicles, comprising a base body in the form of a single-piece hollow tubular cylinder of steel sheet having an outer surface area, and a wall structure projecting in direct contact with and radially outwards from the outer surface area for defining a curved path in concert with the outer surface area of the base body for form-fitting guidance of an engagement member of a gearshift fork connected to a gearshift sleeve of a synchronization device which is arranged for axial displacement between two gears on a gearbox shaft disposed in parallel relation to the base body.

3. The gear shifting drum of claim 2, wherein the wall structure includes two walls in spaced-apart disposition for demarcating the curved path.

4. The gear shifting drum of claim 3, wherein the walls have one of a square, rectangular profile and round profile, and are secured in pairs on the base body.

5. The gear shifting drum of claim 3, wherein the walls are so configured as to provide the curved path with end zones which are substantially closed.

6. The gear shifting drum of claim 2, wherein the wall structure includes at least one wall which is embraced by a forked projection of the engagement member.

7. The gear shifting drum of claim 2, wherein the wall structure includes pre-fabricated perforated disks arranged in pairs on the base body, said disks having an undulating profile to define the curved path.

8. The gear shifting drum of claim 2, wherein the wall structure includes a single-piece U-shaped profile for securement to the outer surface area.

9. The gear shifting drum of claim 2, wherein the base body has open end faces, and further comprising lids made of steel sheet for closing the end faces.

10. The gear shifting drum of claim 9, wherein the lids are provided with axially projecting central pins for support of the base body in a housing of the variable-speed gearbox in assembled state.

11. The gear shifting drum of claim 9, and further comprising a locking device destined for securing the base body against rotation and including a locking member positioned in a housing of the variable-speed gearbox and interacting with impressions formed in one of the lids.

12. A gear shifting device of a variable-speed gearbox for motor vehicles, comprising:
   a control motor;
   a gear shifting drum operated by the control motor and having a base body in the form of a single-piece tubular hollow cylinder of steel sheet having an outer surface area, and a wall structure directed radially outwards from the outer surface area for defining a curved path for form-fitting guidance of an engagement member of a gearshift fork connected to a gearshift sleeve of a synchronization device which is arranged for axial displacement between two gears on a gearbox shaft disposed in parallel relation to the base body;
   a ring gear provided with outer teeth and mounted on the base body, said ring gear operatively connected to the control motor, when the gear shifting drum is assembled, for realizing a rotary drive.

13. A gear shifting drum for a gear shifting device of a variable-speed gearbox for motor vehicles, comprising a base body in the form of a single-piece tubular hollow cylinder of steel sheet having an outer surface area, and a wall structure projecting in direct contact with and radially outwards from the outer surface area for defining a curved path in concert with the outer surface area of the base body for form-fitting guidance of an engagement member of a gearshift fork.

14. A gear shifting drum for a gear shifting device of a variable-speed gearbox for motor vehicles, comprising a base body in the form of a single-piece hollow tubular cylinder of steel sheet having an outer surface area, and a localized wall structure mounted directly on and projecting radially outwards from the outer surface area for defining a raised curved path for form-fitting guidance of an engagement member of a gearshift fork connected to a gearshift sleeve of a synchronization device which is arranged for axial displacement between two gears on a gearbox shaft disposed in parallel relation to the base body.

* * * * *